(12) United States Patent
Schrage

(10) Patent No.: US 11,909,859 B2
(45) Date of Patent: Feb. 20, 2024

(54) REMOVING ACCESS TO BLOCKCHAIN DATA

(71) Applicant: SAP SE, Walldorf (DE)

(72) Inventor: Jan Schrage, Helmstadt-Bargen (DE)

(73) Assignee: SAP SE, Walldorf (DE)

( * ) Notice: Subject to any disclaimer, the term of this patent is extended or adjusted under 35 U.S.C. 154(b) by 430 days.

(21) Appl. No.: 16/890,420

(22) Filed: Jun. 2, 2020

(65) Prior Publication Data

US 2021/0377001 A1 Dec. 2, 2021

(51) Int. Cl.
*H04L 9/06* (2006.01)
*H04L 9/08* (2006.01)
*H04L 9/00* (2022.01)

(52) U.S. Cl.
CPC .......... *H04L 9/0637* (2013.01); *H04L 9/0631* (2013.01); *H04L 9/088* (2013.01); *H04L 9/50* (2022.05)

(58) Field of Classification Search
CPC ..... H04L 9/0637; H04L 9/0631; H04L 9/088; H04L 9/50; H04L 9/3239; H04L 9/3297
See application file for complete search history.

(56) References Cited

U.S. PATENT DOCUMENTS

| | | | |
|---|---|---|---|
| 9,773,119 B2 * | 9/2017 | Sinha | H04L 63/083 |
| 10,740,732 B2 * | 8/2020 | Thomas | G06Q 20/407 |
| 11,386,415 B2 * | 7/2022 | Thomas | G06Q 20/223 |
| 11,392,944 B2 * | 7/2022 | Thomas | G06Q 20/3829 |
| 11,481,771 B2 * | 10/2022 | Thomas | G06Q 20/3823 |
| 2002/0035556 A1 * | 3/2002 | Shah | G06Q 10/10 |
| 2002/0059331 A1 * | 5/2002 | Fujihara | G06F 16/902 |
| 2003/0093429 A1 * | 5/2003 | Nishikawa | G06F 16/284 |
| 2006/0095795 A1 * | 5/2006 | Nakamura | H04L 9/3236 |
| | | | 713/181 |
| 2010/0169669 A1 * | 7/2010 | Smith | G06F 21/6218 |
| | | | 713/193 |

(Continued)

OTHER PUBLICATIONS

Van Geelkerken, et al. "Using Blockchain to Strengthen the Rights Granted Through the GDPR", International Youth Science Forum, Nov. 23-25, 2017, 4 pages.
Faber, et al. "BPDIMS: A Blockchain-Based Personal Data and Identity Management System", Proceedings of the 52nd Hawaii International Conference on System Sciences, 2019, 10 pages.

(Continued)

*Primary Examiner* — Abu S Sholeman
(74) *Attorney, Agent, or Firm* — Fountainhead Law Group P.C.

(57) ABSTRACT

Access to blockchain data may be removed by deleting an encryption key held in a remote server. Incoming data is stored in the blockchain after being encrypted at the key server. An ordinary blockchain user gains access to the data, after forwarding the encrypted data to the remote key server for decryption. Upon receipt of an input (e.g., time stamp), the key server deletes the key. Thereafter, the encrypted data on the blockchain is rendered inaccessible to the ordinary blockchain data user. At no point, does the ordinary data user have access to the key stored in the remote server. Embodiments may find particular use in removing access to personal data stored in a blockchain following the elapse of a predetermined amount of time, as may be required by privacy laws. Granular control over data access can may be afforded through the use of composite keys and/or key hierarchies.

18 Claims, 12 Drawing Sheets

(56) References Cited

U.S. PATENT DOCUMENTS

| | | | |
|---|---|---|---|
| 2014/0208115 A1* | 7/2014 | Fukada | H04L 9/0891 |
| | | | 713/168 |
| 2018/0060496 A1* | 3/2018 | Bulleit | H04L 9/0643 |
| 2019/0138633 A1* | 5/2019 | Charles | G06F 16/2308 |
| 2019/0228165 A1* | 7/2019 | McMillan | H04L 9/0894 |
| 2019/0251558 A1* | 8/2019 | Liu | H04L 63/0435 |
| 2019/0279752 A1* | 9/2019 | Vitkin | G16H 50/30 |
| 2019/0305932 A1* | 10/2019 | Townsend | H04L 9/3265 |
| 2020/0162238 A1* | 5/2020 | Yoon | H04L 9/088 |
| 2021/0006400 A1* | 1/2021 | Hu | G06F 21/64 |
| 2021/0184848 A1* | 6/2021 | Roowalla | G06F 11/3006 |
| 2021/0211271 A1* | 7/2021 | Kuang | H04L 9/3239 |
| 2021/0216529 A1* | 7/2021 | Huang | G06F 21/62 |
| 2021/0306139 A1* | 9/2021 | Wright | H04L 9/0869 |

OTHER PUBLICATIONS

Vranken "Actually There Could Be a Way to Delete Data on a Blockchain", Dec. 8, 2017, 2 pages.
Van Geelkerken, et al. "Using Blockchain to Strengthen the Rights Granted Through the GDPR", International Youth Schience Forum, Nov. 23-25, 2017, 4 pages.
Faber, et al. "BPDIMS: A Blockchain-Based Personal Data and Identity Management System", Proceedings of the 52nd Hawaii International Conference on System Sciences, Jan. 2019, 10 pages.
Vranken, et al. "The Blockchain-GDPR Paradox", dated Nov. 14, 2019, downloaded from https://medium.com/@artusvranken/actually-there-could-be-a-way-to-delete-data-on-a-blockchain-df62964bd927, 2 pages.

* cited by examiner

FIG. 7

- Employee ID: 123456
- Country: DE
- State: BW
- Community: Stuttgart
- Category: Absence
- Key Date: 2019-08-08
- Data block

- Employee ID: 7672837
- Country: DE
- State: BW
- Community: Stuttgart
- Category: Absence
- Key Date: 2018-05-08
- Data block

- Employee ID: 8237373
- Country: DE
- State: BW
- Community:
- Category: Health
- Key Date: 2019-01-01
- Data block

FIG. 8

- Country: DE
- State: BW
- Community: Stuttgart
- Category: Absence
- Key Date: 2019-08-08
- Data block:
  { (employee 1, data for employee 1),
  ...
  (employee n, data for employee n) }

FIG. 9

- Employee ID: 123456
- Country: DE
- State: BW
- Community: Stuttgart
- Category: Absence
- Key Date: 2019-01-01
- Data block

- Employee ID: 123456
- Country: DE
- State: BW
- Community: Stuttgart
- Category: Absence
- Key Date: 2017-02-08
- Data block

- Employee ID: 654321
- Country: DE
- State: BW
- Community: Stuttgart
- Category: Absence
- Key Date: 2017-02-15
- Data block

- Employee ID: 654321
- Country: DE
- State: BW
- Community: Stuttgart
- Category: Absence
- Key Date: 2017-03-01
- Data block

FIG. 10

- Employee ID: encrypted with ee key(123456)
- Country: DE
- State: BW
- Community: Stuttgart
- Category: encrypted with category key (Absence)
- Key Date: 2017-02-08
- Data block (encrypted with composite key)

- Employee ID: encrypted with ee key(654321)
- Country: DE
- State: BW
- Community: Stuttgart
- Category: encrypted with category key (Absence)
- Key Date: 2017-02-15
- Data block (encrypted with composite key)

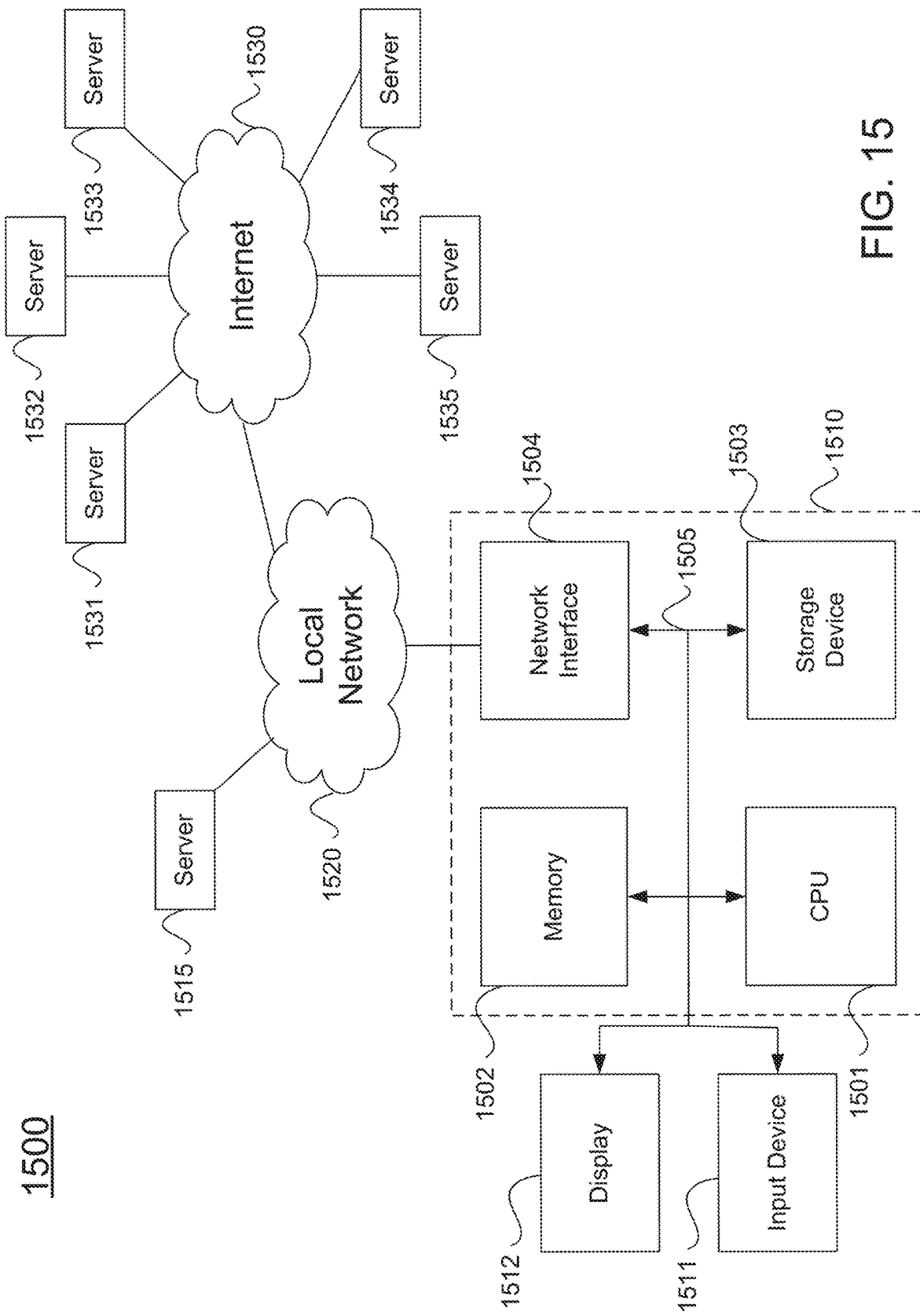

REMOVING ACCESS TO BLOCKCHAIN DATA

BACKGROUND

Unless otherwise indicated herein, the approaches described in this section are not prior art to the claims in this application and are not admitted to be prior art by inclusion in this section.

A blockchain comprises a growing list of blocks, in which each block contains a cryptographic hash of the preceding block, a time stamp, and data content. The blockchain includes an unmodifiable ledger, ensuring reliability and imparting resistance to tampering. Specifically, modification of earlier parts of the chain will break this cryptographic link in the chain.

Under certain circumstances, however, it may be desirable to remove data from a blockchain. For example, privacy laws may impose strict time limitations on the storage of personal information. Moreover, under certain circumstances (e.g., a court order) it may be mandated to delete data from storage.

SUMMARY

Access to data stored in a blockchain, may be removed by deleting an encryption key held in a server remote from the blockchain. Incoming data is stored in the blockchain after being encrypted at the key server. An ordinary data user of the blockchain gains access to the data after forwarding the encrypted data to the remote key server for decryption. Upon receipt of an input (e.g., time stamp), the key server deletes the key. Thereafter, the encrypted data on the blockchain is rendered inaccessible to the ordinary data user. At no point, does the ordinary data user have access to the key stored in the remote server. Embodiments may find particular use in removing access to personal data stored in a blockchain, as may be required following the elapse of a predetermined time period dictated by applicable privacy statutes. More granular control over access to blockchain data can be afforded through the use of composite keys and/or key hierarchies.

The following detailed description and accompanying drawings provide a better understanding of the nature and advantages of various embodiments.

BRIEF DESCRIPTION OF THE DRAWINGS

FIG. 7 shows an employee-centric data schema with exemplary data blocks in a blockchain.

FIG. 8 shows an example block in a blockchain.

FIG. 9 shows a blockchain comprising blocks with human resources data for employees.

FIG. 10 is a simplified view of data blocks of a blockchain including employee information.

FIG. 15 illustrates an example computer system.

DETAILED DESCRIPTION

Described herein are methods and apparatuses that implement removal of access to blockchain data. In the following description, for purposes of explanation, numerous examples and specific details are set forth in order to provide a thorough understanding of embodiments according to the present invention. It will be evident, however, to one skilled in the art that embodiments as defined by the claims may include some or all of the features in these examples alone or in combination with other features described below, and may further include modifications and equivalents of the features and concepts described herein.

Figure 1:
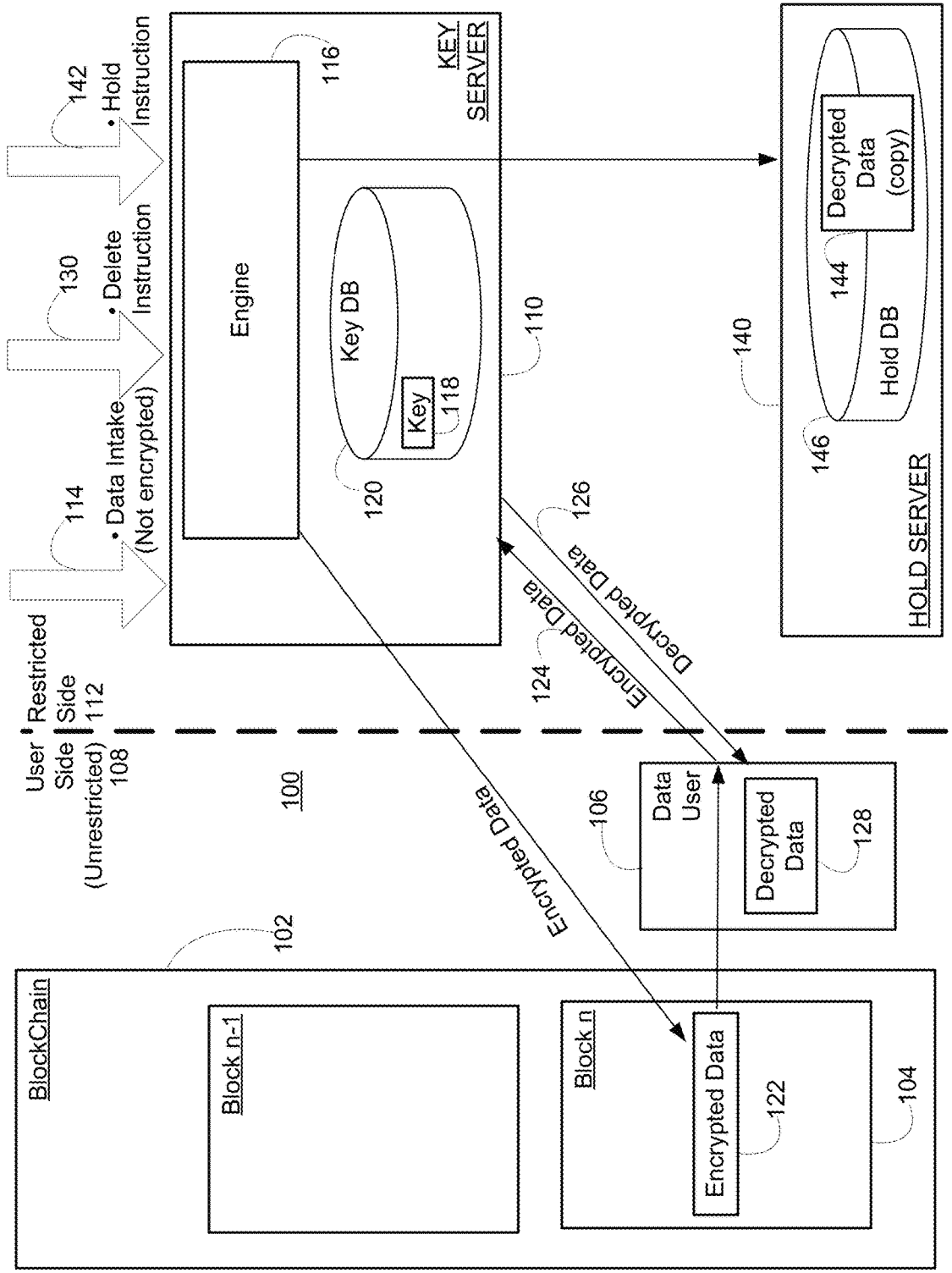
FIG. 1 shows a simplified diagram of a system according to an embodiment.

FIG. 1 shows a simplified view of an example system that is configured to implement removal to access of blockchain data according to an embodiment. Specifically, system 100 comprises a blockchain 102 comprising respective blocks 104. These blocks are accessible to an ordinary data user 106 located on a user side 108.

Key server 110 is located on a restricted side 112. This side 112 is deemed "restricted", in the sense that the ordinary data user is limited to interacting with the key server to decrypt certain information from the blockchain. More intimate interaction with the key server, however, is limited to higher level users (such as administrators).

The engine is configured to receive a first input 114 comprising an intake of data. Access to at least a portion of that incoming data by the data user, is slated to be removed at some future time, as implemented according to embodiments described herein.

In particular, a processing engine 116 of the key server, is configured to recognize specific components of the incoming data as being subject to access removal. The engine is then configured to encrypt the data so recognized.

This encryption at the key server is performed according to key(s) 118 stored within key database 120. Then, the engine is configured to instruct the key server to communicate the encrypted data 122 for storage in block 104 of the blockchain.

As a part of everyday usage, the data user seeks the data stored in the blockchain (e.g., for purposes of analysis). For the unencrypted data of the blockchain, this is straightforward.

For blockchain data encrypted by the key server, however, the data user first needs to forward 124 that encrypted data to the key server. In response, the key server performs decryption according to the key, and returns 126 the decrypted data 128 to the data user for reference.

Importantly, at no point during the above process is the key itself available to the ordinary data user of the blockchain. Rather, the key remains securely held within the key server on the restricted side, where the process of data decryption is performed.

At some future point, a second input 130 is received by the key server. This second input triggers the removal of access to data by the ordinary data user.

According to some embodiments, the second input may be a specialized command or instruction. However this is not required.

In other embodiments, the second input may merely be a signal indicating the passage of relative or absolute time (e.g., a clock signal or a timestamp). Receipt of such temporal information may automatically provoke (e.g., via application of a ruleset of the key server) the removal of access to the encrypted data in the blockchain.

Specifically, following receipt of the second input, the engine deletes the key within the key server. Such removal can comprise removing the key from the key server, or deleting a pointer to the key.

As a result, the key is no longer available to the key server to respond to requests from the ordinary blockchain data user. Thus, the ordinary data user is no longer able to decrypt the encrypted data that is present in the blockchain. Ultimately, the end effect is to deny the ordinary user access to the actual content of the encrypted data in the blockchain.

Under specific circumstances (such as a court order), it may be necessary to preserve particular data of the blockchain. Accordingly, the restricted side further comprises a hold server 140.

Receipt of a third input 142—either by the key server (shown) or alternatively the hold server directly—can trigger storage of a copy 144 of specific data in decrypted form to a separate hold database 146. Within that hold database 146, the data can be securely preserved pending ultimate resolution of the hold order.

Figure 2:
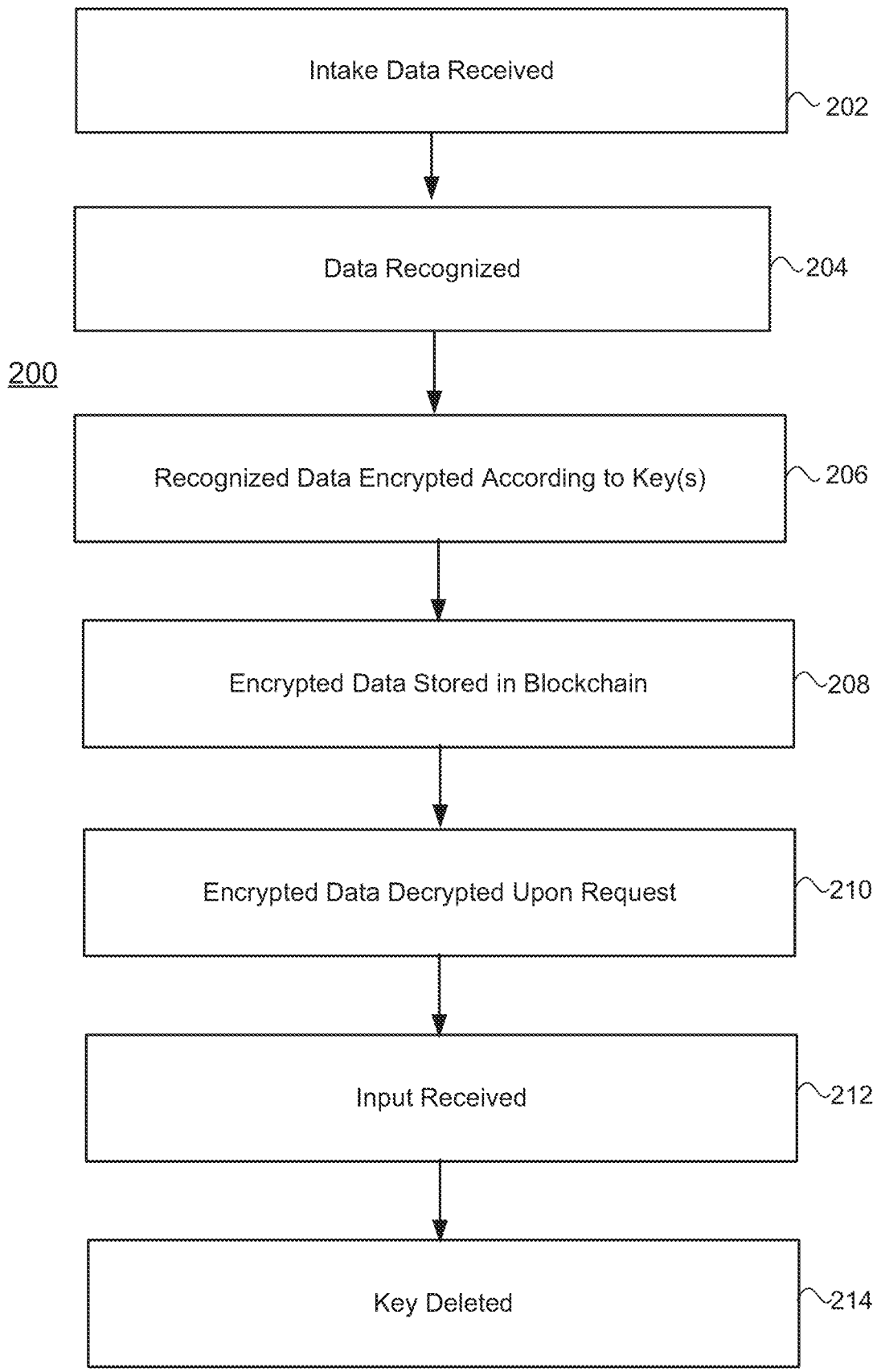
FIG. 2 shows a simplified flow diagram of a method according to an embodiment.

FIG. 2 is a flow diagram of a method 200 according to an embodiment. At 202, a data intake is received.

At 204, the data (or portion thereof) is recognized as being earmarked for future removal of access. At 206, the recognized data (or a recognized portion thereof) is encrypted according to key(s).

At 208, the encrypted data is stored in a blockchain. At 210, in response to a request from a user of the blockchain, the encrypted data is retrieved from the blockchain, decrypted, and sent to the blockchain user.

At 214, in response to an input received at 212, the key (or a pointer thereto) is deleted from the database.

Further details regarding removal of access to blockchain data according to embodiments, are now provided in connection with the following example.

Example

The Human Capital Management (HCM) tool available from SAP SE of Walldorf, Germany, is useful for performing complex and detailed analysis of the Human Resources (HR) data available to an enterprise. The HR data stored in HCM may be accessible to a user through the SAP Business Connector (BC) infrastructure.

Under certain circumstances, it may be desirable to store HR information as a blockchain. But, government legislation—such as Germany's General Data Protection Regulation (GDPR)—may demand that personal data be purged after a certain time period. However, as described above the blockchain mechanism does not provide for the actual removal of data.

Accordingly, embodiments allow the personal HR data stored within the blockchain, to be rendered inaccessible by encrypting it with a random key stored in a central key server. At the time when the personal data is to be rendered inaccessible, the key is deleted. Without the key, the personal data can never again be read from the blockchain.

Figure 3:
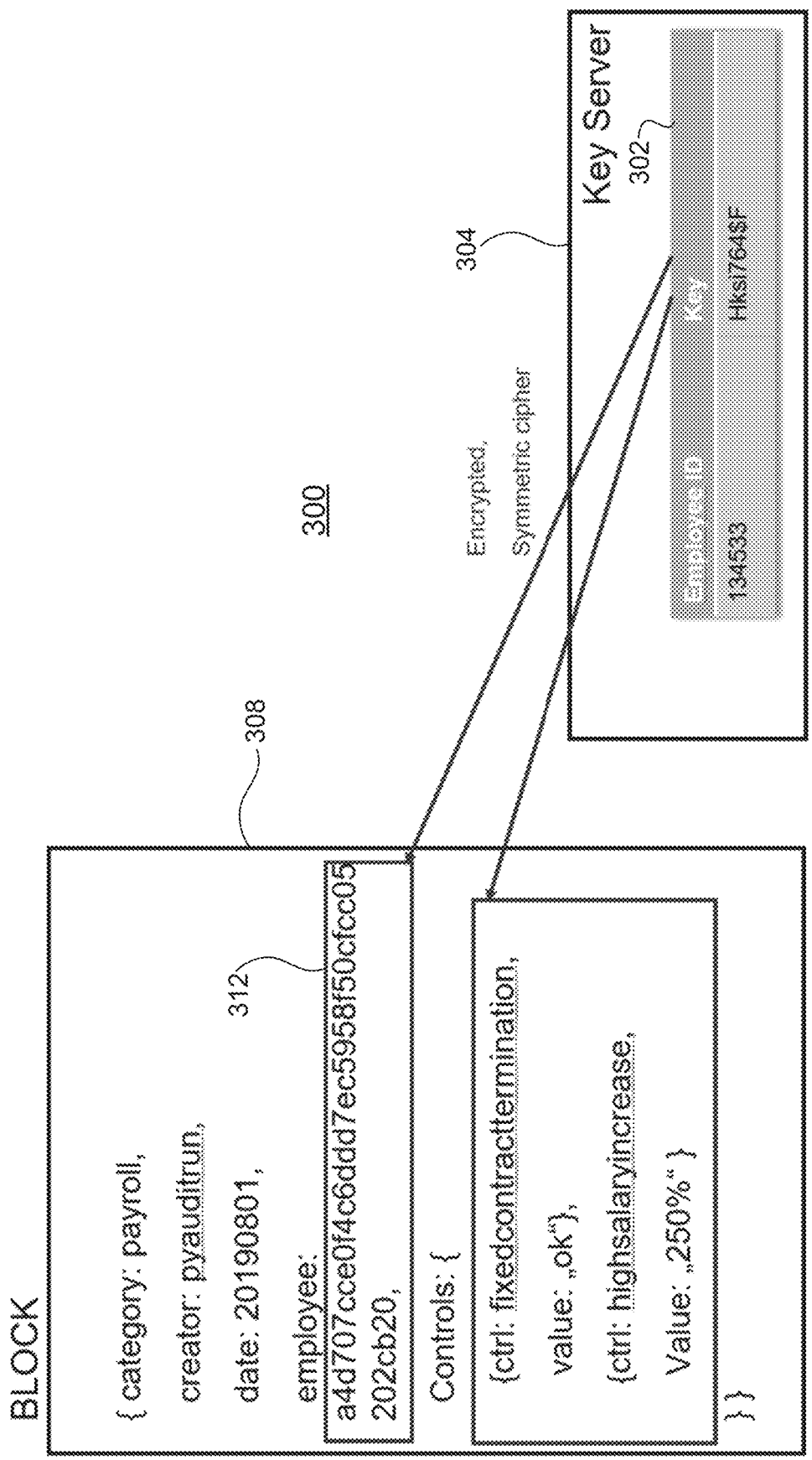
FIG. 3 depicts a simplified architecture according to an example illustrating blockchain storage of human resources information.

FIG. 3 shows a simplified view of an example illustrating application to the storage of HR information in a block of a blockchain. FIG. 3 shows a highly simplified architecture 300 where access to blockchain data is managed at the employee level.

A random key 302 is generated at a keyserver 304 for each employee. The random key 302 is stored exclusively in the keyserver 304.

Within the block 308 of the blockchain, privacy-sensitive fields such as the employee ID 312 and the relevant data are encrypted with this random key. Access to the key server and the key stored therein, is limited to higher level users such as audit tools.

Upon receipt of instruction to purge personal HR data of the employee, it is only necessary to permanently delete the key on the keyserver. This will leave the blockchain intact, but render privacy-sensitive data for this employee unreadable thereafter.

Beyond the basic embodiment shown and described in connection with FIG. 4, further refinements are possible. For example, some embodiments may also account for factors such as regional legislation and/or various timing schemes—depending on the type of data being stored on the blockchain.

Figure 4:
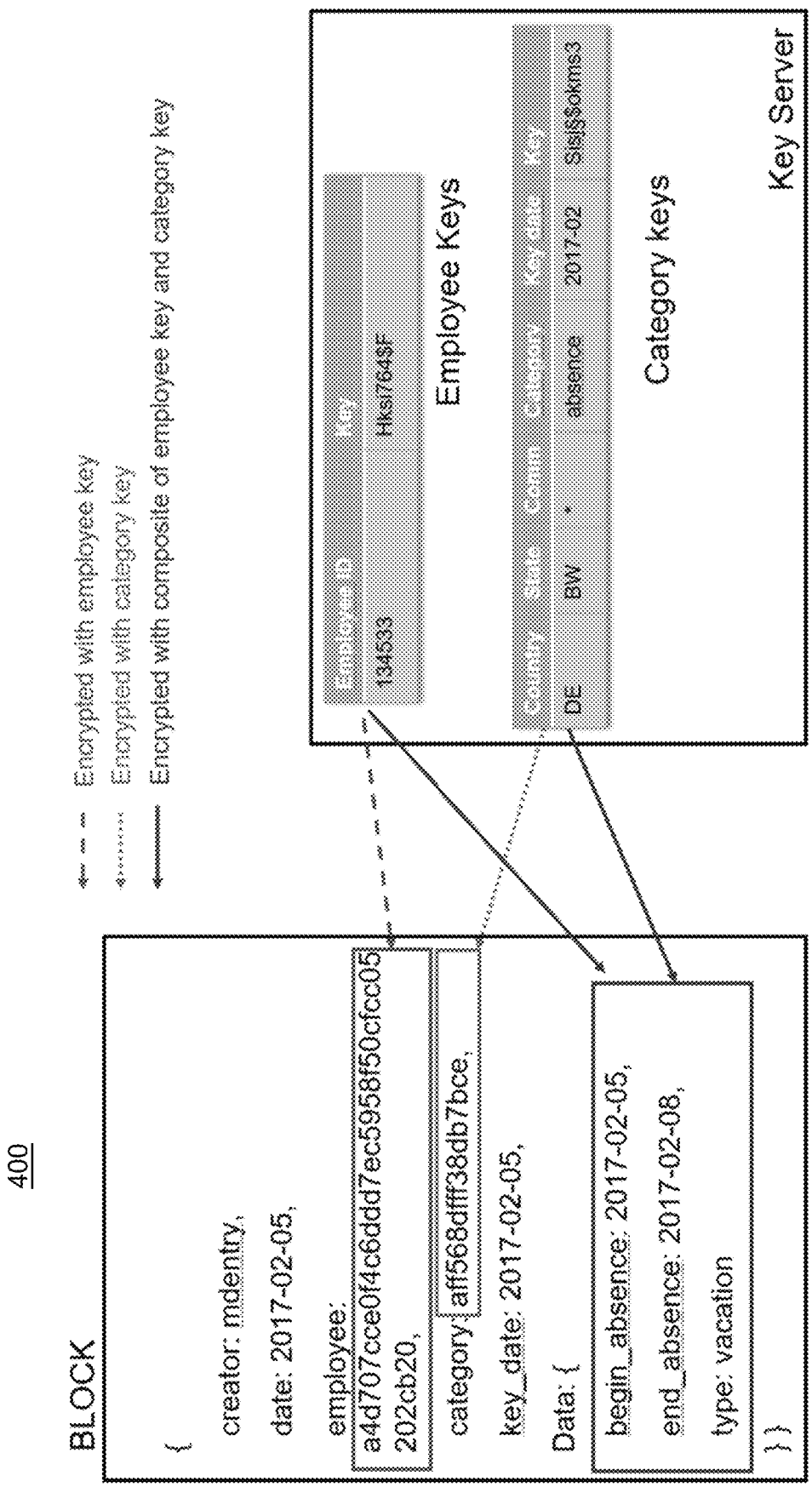
FIG. 4 shows a simplified view of an alternative architecture according to an embodiment accommodating granularity of information utilizing composite key generation.

Accordingly, FIG. 4 shows a simplified view of an alternative architecture 400. This architecture recognizes granularity (e.g., by legal entity, category, and date), utilizing the generation of composite keys. Further details regarding the embodiment of FIG. 4 are discussed below.

In the manner just described, a blockchain may be used to store personal or HCM data compliant with the requirements of applicable privacy legislation.

Figure 5:
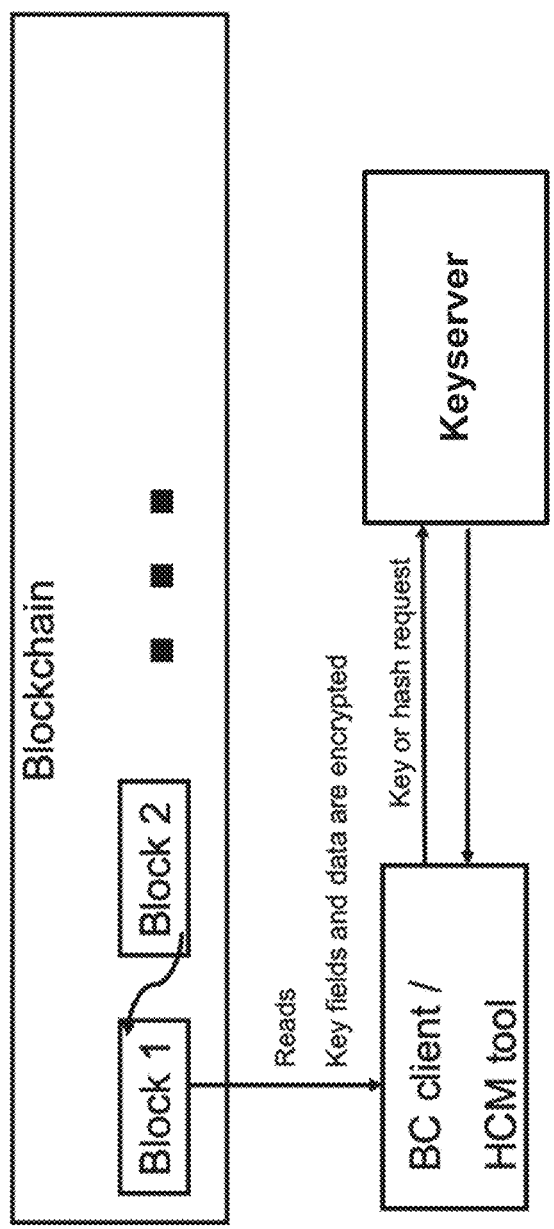
FIG. 5 is a simplified view showing a Read operation according to an example.

FIG. 5 is a simplified view showing a Read operation according to the example. An existing block is read, and the data is processed. Key fields and data are decrypted with the relevant keys retrieved from a key server.

Figure 6:
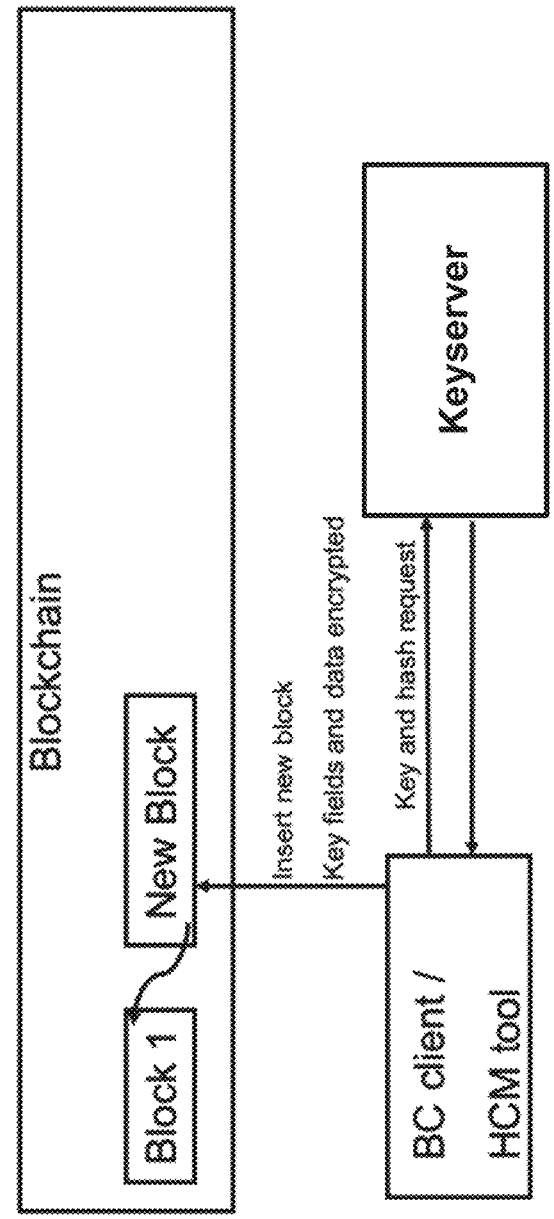
FIG. 6 is a simplified view showing a Write operation according to an example.

FIG. 6 is a simplified view showing a Write operation according to an example. A new block is created and appended to the chain. Key fields and data are encrypted.

Further description of embodiments that recognize granularity for compliant access removal, is now provided. In particular, it may be desirable to maintain the ability to remove access to data as required by either legislation or court orders.

Under such an approach, data blocks inside a blockchain may be identifiable by:
- Employee
- Country
- State
- Community
- Category of data (e.g. health data, absence data, . . . )
- Key date (date, for which the data applies—if, e.g. a block is created for a retroactive entry for the prior month, this date will differ from the current timestamp, and the date relevant for deletion will be the prior month).

Thus, FIG. 7 shows an employee-centric data schema with example data blocks in a blockchain (unencrypted). With this schema, it is possible to, e.g.:
- identify all absence data prior to 2019 (employee 7672837) after a legal period for retaining it has passed
- identify all data for employee 123456 following a court order
- identify all health data for Germany prior to February 2019
- account for specific state and communal regulations To allow for removal of access to this data, an encryption key approach may recognize at least the same granularity. For example, such an embodiment may account for at least the following types of access removal.

Delete data for all employees for a given choice of country, state, community, and category before key date.

Delete all or selected data for a single employee (e.g. court order).

Delete all data for a single employee (e.g. x years after termination).

According to a process-based data schema, a data block could be identified by category/process, and include a list of employees with data. Data management requirements remain the same.

A block in such a blockchain would look like FIG. 8. Key schema and encryption and access removal strategies are as in the simplified case and as further described below.

Specifically, given the requirement to remove access either on a category basis or on an employee basis, a composite key is created. That composite key is made up of an employee key and a category key.

Access to all employee data can be removed by deleting the employee key.

Access to all data of a category can be removed by deleting the category key. Note that "category" implies a selection with the granularity given earlier, including country, state, community and key date. Each category will have a number of date-based keys.

A specific example is now presented. FIG. 9 shows a blockchain comprising blocks with HR data for employees.

Here, for the German state of Baden-Wuerttemberg (BW), employee absence records need to be deleted after two years. The current date is March 2019.

One employee has a unique identifier (ID) of 123456. Another employee has a unique ID of 654321. These IDs are stored in a table together with a corresponding employee key.

| Employee | Employee Key |
| --- | --- |
| 123456 | Koskd308u |
| 654321 | sdiojf78e7zh |

The employee 123456 has two stored absence records: one for January 2019, and another for February, 2017. This absence information is stored in the following table, together with a corresponding absence key.

| Country | State | Community | Category | Date | Absence Key |
| --- | --- | --- | --- | --- | --- |
| Germany | BW | Stuttgart | Absence | 2017 February | Asounen |
| Germany | BW | Stuttgart | Absence | 2017 March | aso983h |
| Germany | BW | Stuttgart | Absence | 2019 January | 083ujrn |

The composite key for accessing this absence data for these employees, will be a composition of the employee key and the absence keys for the time period (year-month):

Employee 123456 in 2017-02: Koskd308u-Asounen
Employee 123456 in 2019-01: Koskd308u-083ujrn
Employee 654321 in 2017-02: sdiojf78e7zh-Asounen
Employee 654321 in 2017-03: sdiojf78e7zh-aso983h Per a deletion run performed in March 2019, the entry in the second table with the category keys for 2017-02 for absences will be deleted. (It is older than two years). In this manner, absence data during this period in BW Germany will be not be recoverable for any employees.

Deletion of the absence key for 2017-02 results in:
Employee 123456 in 2017-02: Koskd308u-
Employee 123456 in 2019-01: Koskd308u-083ujrn
Employee 654321 in 2017-02: sdiojf78e7zh-
Employee 654321 in 2017-03: sdiojf78e7zh-aso983h Here, the absence data for the two entries marked in bold above, is not recoverable.

Should all data for an employee need to be deleted, the entry in the first table will be deleted. This renders all keys pertaining to that employee unrecoverable. Thus if employee 123456 is deleted:

Employee 123456 in 2017-02: -Asounen
Employee 123456 in 2019-01: -083ujrn
Employee 654321 in 2017-02: sdiojf78e7zh-Asounen
Employee 654321 in 2017-03: sdiojf78e7zh-aso983h Here, the two entries marked in bold will be unrecoverable. Everybody else's data will remain untouched.

Certain embodiments may implement category and employee encryption in order to achieve the following two additional objectives.

In addition to encrypting the actual data, the employee ID may be considered sensitive information. Thus the employee ID itself may need to be encrypted.

The fact that an employee had certain types of data attached, may be in and of itself be a sensitive fact. For example, destroying a record about disability may be insufficient—the fact that an entry for category "disability" existed for an employee may be sensitive as well. In effect, the category is to be encrypted.

For such encryption, the key scheme described in the example above can be used. The employee ID gets encrypted with the employee key, and the category ID gets encrypted with the category key.

Such an approach merely involves an additional encryption/decryption step in reading, searching, or writing. FIG. 10 is a simplified view of the resulting data blocks.

In FIG. 10, deletion of absence data from 2017-02 will then render the fields marked in bold unrecoverable. The absence data for both employees, as well as the fact that there was an absence record at all, will not be recoverable.

Details regarding the key server according to certain embodiments, are now described. The key server accomplishes one or more particular objectives that can include but are not limited to:

generating and storing encryption keys;
implementing access APIs allowing for search by data fields and key;
permitting key retrieval by trusted clients;
deleting encryption keys after retention time (configuration-based);
maintaining an audit log of key destruction.

Figure 11:
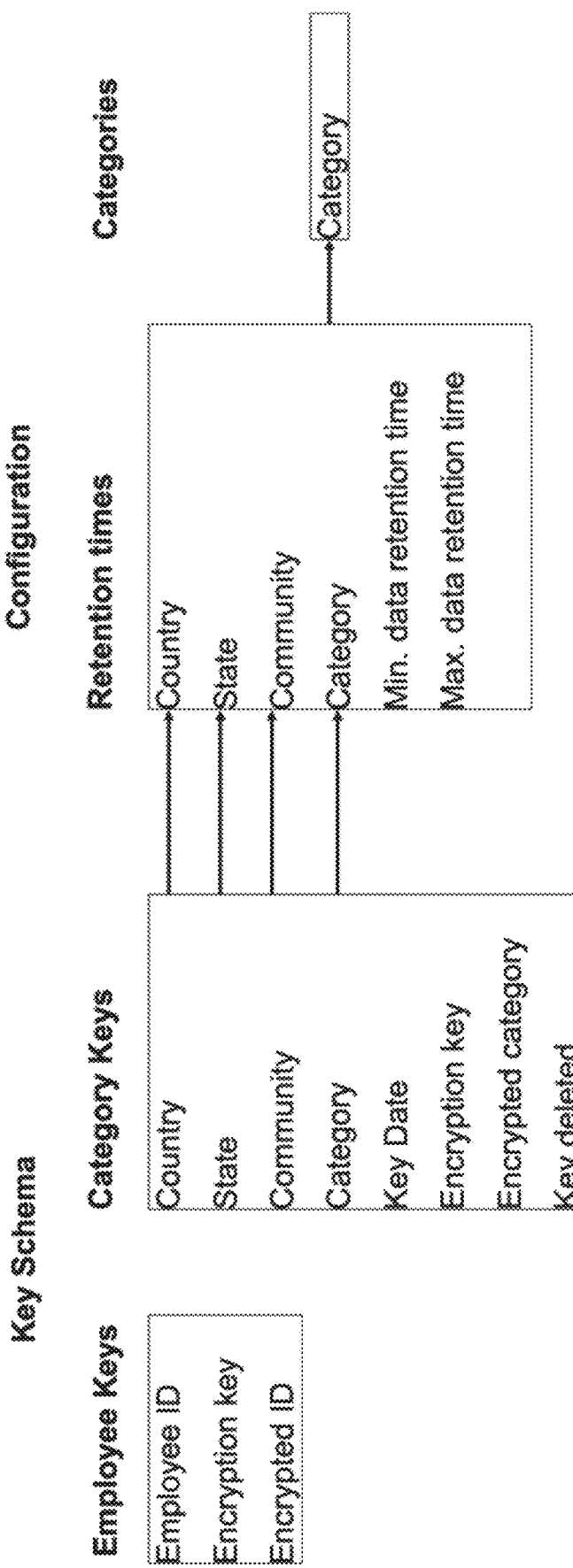
FIG. 11 depicts an exemplary simplified data schema.

An exemplary simplified data schema is shown in FIG. 11. For simplicity, the country/state/community configuration tables are omitted.

Fields for the key schema of FIG. 11 are now described. The tables are dynamic and keys are generated by the server on demand Employee Keys according to this example are as follows:
Employee ID: ID of the employee
Encryption key: randomly generated encryption key for this employee
Encrypted ID: ID encrypted with this key for query purposes Category Keys according to this example are as follows:

Country, State, Community: Typically, data destruction laws apply on country or state level, in rare cases communities have their own regulations.

Category: The data category (or process)

Key date: The date to which the key applies. A monthly granularity is typically sufficient for legal purposes. Upon receipt of data purging instructions, keys with a date before the "delete before" date are deleted.

Encryption key: randomly generated encryption key

Encrypted category: category encrypted with this key for query purposes

Key deleted: If a key is deleted during a destruction run, the encryption key field should be deleted, and this field set. This allows the server to identify destroyed data on queries, as well as prevent generation of new keys for deleted periods.

Various fields for the configuration of FIG. 11 are now described. These tables are configuration tables and have no dynamic content.

Retention times fields are as follows:

Country/State/Community: Identifies the applying legislative entity

Category: The category/process

Min. Data retention time: Minimal data retention time; data for this entity will be destroyed earliest after the minimal data retention time Max. Data retention time: Maximum data retention time. After this time, data destruction is mandatory.

The Categories table contains all valid categories (or processes). It is global: locally different retention times for the same category are configured in the retention times table.

The nature of the encryption keys stored on the keyserver according to this specific example, is now discussed. Encryption keys are randomly generated.

A predictable key generation schema (e.g. a category/date composite key, generated as "category key+date") can be reconstructed and prevents destruction. Rather the basis of data access removal is that here, that the (random) keys follow no recognizable pattern, and after deletion cannot be recovered.

Embodiments may utilize a symmetrical cipher as an encryption procedure. A variety of standardized, secure ciphers (such as AES) are available.

Operation of the key server according to this specific example, is now discussed. The key server provides operations for the following functions:

key generation—for employees and categories for an insert operation;

querying—both for encrypted and unencrypted fields;

key destruction.

Key generation and querying may be implemented as APIs. The performance of key destruction (runs) may be somewhat more complex. In particular, the key destruction function may utilize an appropriate UI that allows an operator to trace it, and to make deletion decisions.

The above functions of a keyserver are now detailed. For key request/generation for an insertion into a blockchain, in this context a new key will be generated if the data concerns a new employee, or a new date or locality for a category.

If a key already exists, the existing key will be returned. If a key does not already exist, a new key will be generated and returned. If a key does not exist but has an entry with a deletion flag, a new key will not be generated.

Figure 12:
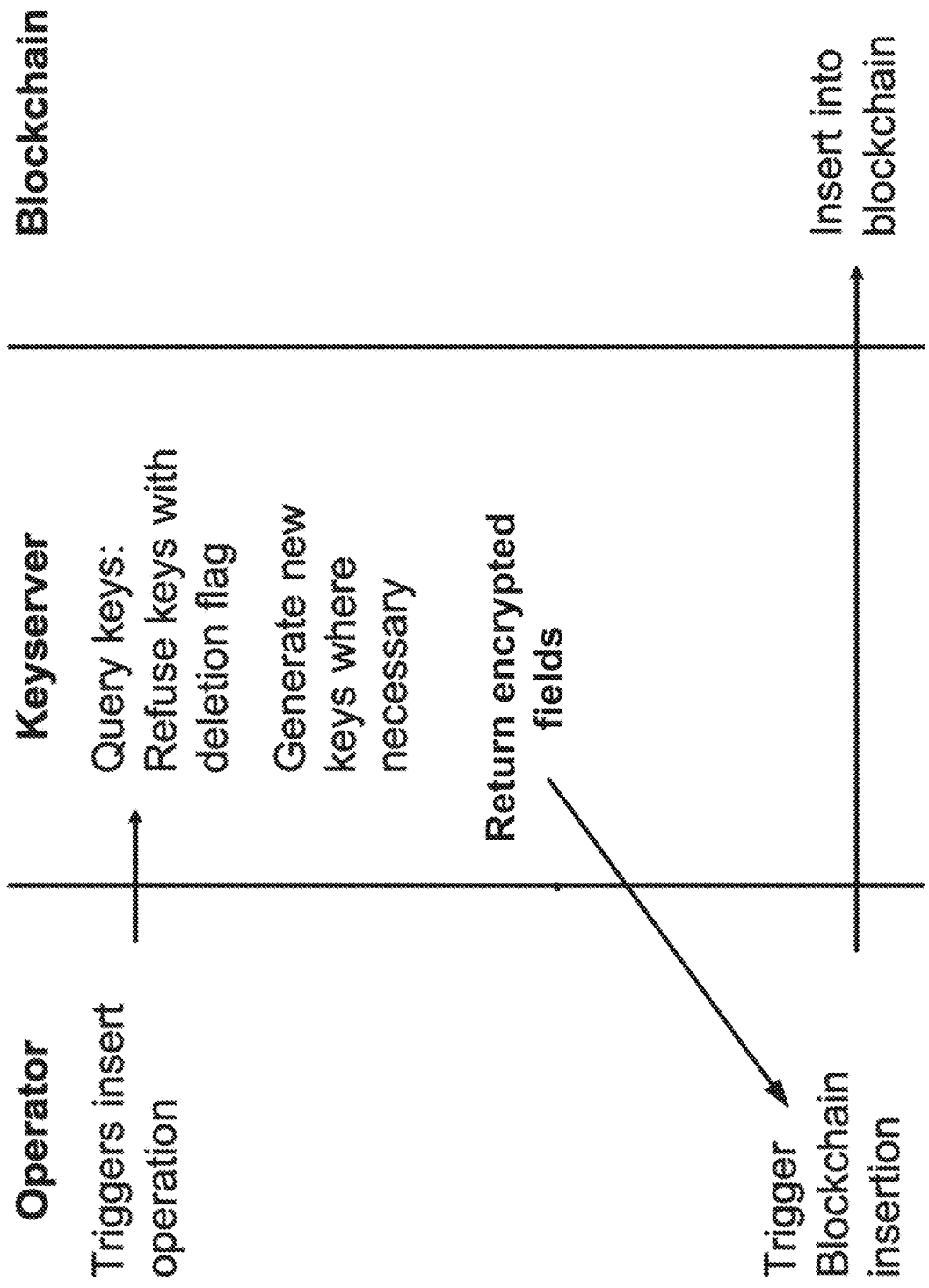
FIG. 12 is a simplified view showing interactions between the keyserver, blockchain, and operator according to an example.

FIG. 12 is a simplified view showing the interactions between the Keyserver, Blockchain, and Operator. Here, "Operator" refers to either an operator or a tool running the insertion process.

For querying, the keyserver accommodates the following use cases, with queries indicating if search results in deleted keys.

A single block is read from the blockchain, and relevant fields are to be decrypted. For this, a query on the known metadata including the encrypted employee/category fields on the key tables is provided.

Data is to be searched in the blockchain (e.g., a specific employee or a specific category). For this, a query on known metadata is provided that returns the relevant encrypted fields, that can then be searched in the blockchain.

For key destruction, the process may be triggered manually or automatically (e.g., over certain time intervals). Typically, once a month may be sufficient for legal purposes. In one or both cases, human intervention and a destruction instruction may be necessary.

Given the existence of minimum and/or maximum retention times that may prescribe some freedom in what gets deleted, a destruction run may need to accomplish one or more of the following:

Flag data for destruction that is mandatory (over max. Retention time)

Flag data for optional destruction (over min. Retention time but below max.)

Show the selection to an operator and allow for decisions on data flagged as optional Execute key destruction Security aspects are now discussed. Conventionally, "data destruction" may be executed by deleting records from a data base or a file system. However, this does not render those records inaccessible. On the file system level, all that is really deleted is the pointer to the data. That data itself can still be read with forensic tools, unless it has been repeatedly overwritten. If file servers are situated in-house, this is not a difficult thing to do.

By contrast, the embodiments as described herein avoid this issue. With a key server in the cloud, the file system is not accessible locally. While an operator of a data center might still have access to the hardware and forensic tools, such a data recovery scenario is less likely than the one described above.

As long as a secure encryption procedure is used and the key is sufficiently long, once the key is deleted on the keyserver, with the approach as described herein data cannot be read by anyone again.

It is noted that under some circumstances, data may need to be preserved from deletion, even after a time period prescribed by statute. One example of this is a legal hold on data destruction that may be imposed by a court.

Specifically, a legal hold needs to be enacted on a court order that requires the data of one or more employees to be maintained. According to a composite key approach as has been described herein, such a hold would preclude the destruction of category keys that would affect employees on hold, and with it, all other employees with data in those categories.

An alternative tack could be to generate a new key per employee and event. However, this would be inelegant, inefficient, and would require the generation and management of a large number of keys for an entity of even moderate size.

It is emphasized, however, that a legal hold event is by its nature typically a relatively extraordinary event that is limited in time and in scope (e.g., affecting only a few employees). Accordingly, embodiments as described herein may adopt an approach wherein information that is deemed subject to a legal hold, is copied and maintained in a separate, secure location pending resolution of the hold.

Figure 13:
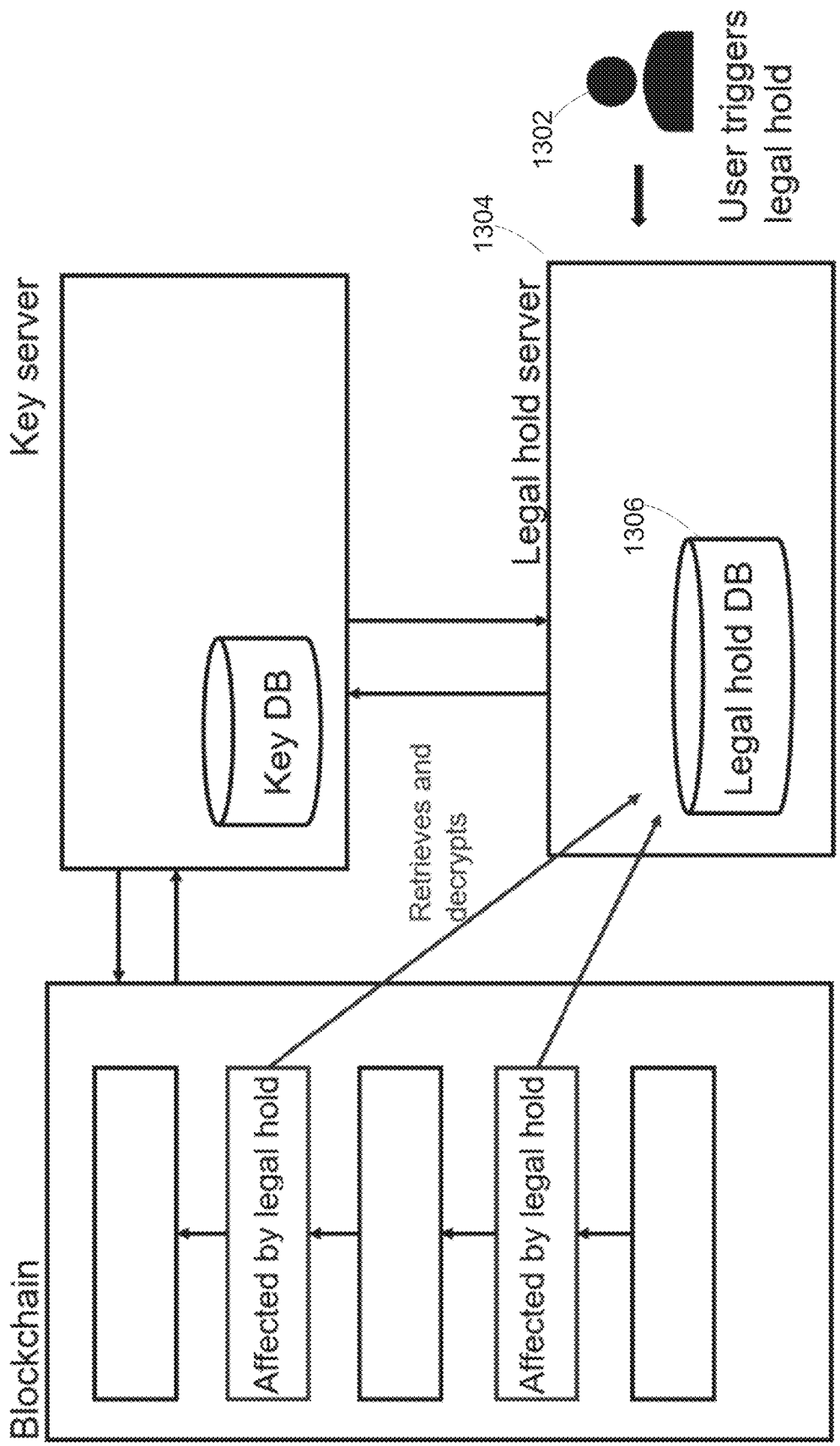
FIG. 13 is a simplified view illustrating the implementation of a legal hold according to an embodiment.

FIG. 13 is a simplified view illustrating an architecture 1300 permitting the implementation of a legal hold according to an embodiment. Specifically, upon receiving notification of a legal hold, a user 1302 triggers a legal hold in a legal hold server 1304.

This legal hold server retrieves all affected employee data and related keys from the blockchain. The legal hold server then decrypts that information, and stores it in a secure database 1306. Ultimately, upon conclusion of the legal hold (e.g., resolution of the lawsuit), that data within the legal hold server is deleted.

The configuration of FIG. 13 stores the legal hold data in a separate database for variety of reasons. The separate legal hold storage needs to have a secure DB that is only accessible by authorized personnel. In effect, it takes all affected data out of the cycle of data destruction (which is exactly what a legal hold does).

The legal hold server and database ensures that regular data destruction in the blockchain is not affected, and can go on. Access to data in the blockchain of employees lacking any legal hold, will continue to be removed.

Once the legal hold for an employee is over and the data in the legal hold server is deleted, this employee's blockchain data will be compliant with applicable data destruction requirements without any additional further action being required. The manual intervention to implement data preservation for a legal hold event does not impose a significant burden, as a legal hold is a manual activity in its nature. That is, both the start and the end of a legal hold process is initiated by an individual upon receipt of a court order.

Returning now to FIG. 1, there the particular embodiment is depicted with the engine responsible for access to blockchain data as being located outside of the database storing the keys. However, this is not required.

Rather, alternative embodiments could leverage the processing power of an in-memory database engine (e.g., the in-memory database engine of the HANA in-memory database available from SAP SE), in order to perform various functions, including but not limited to key creation, querying, and key destruction.

Figure 14:
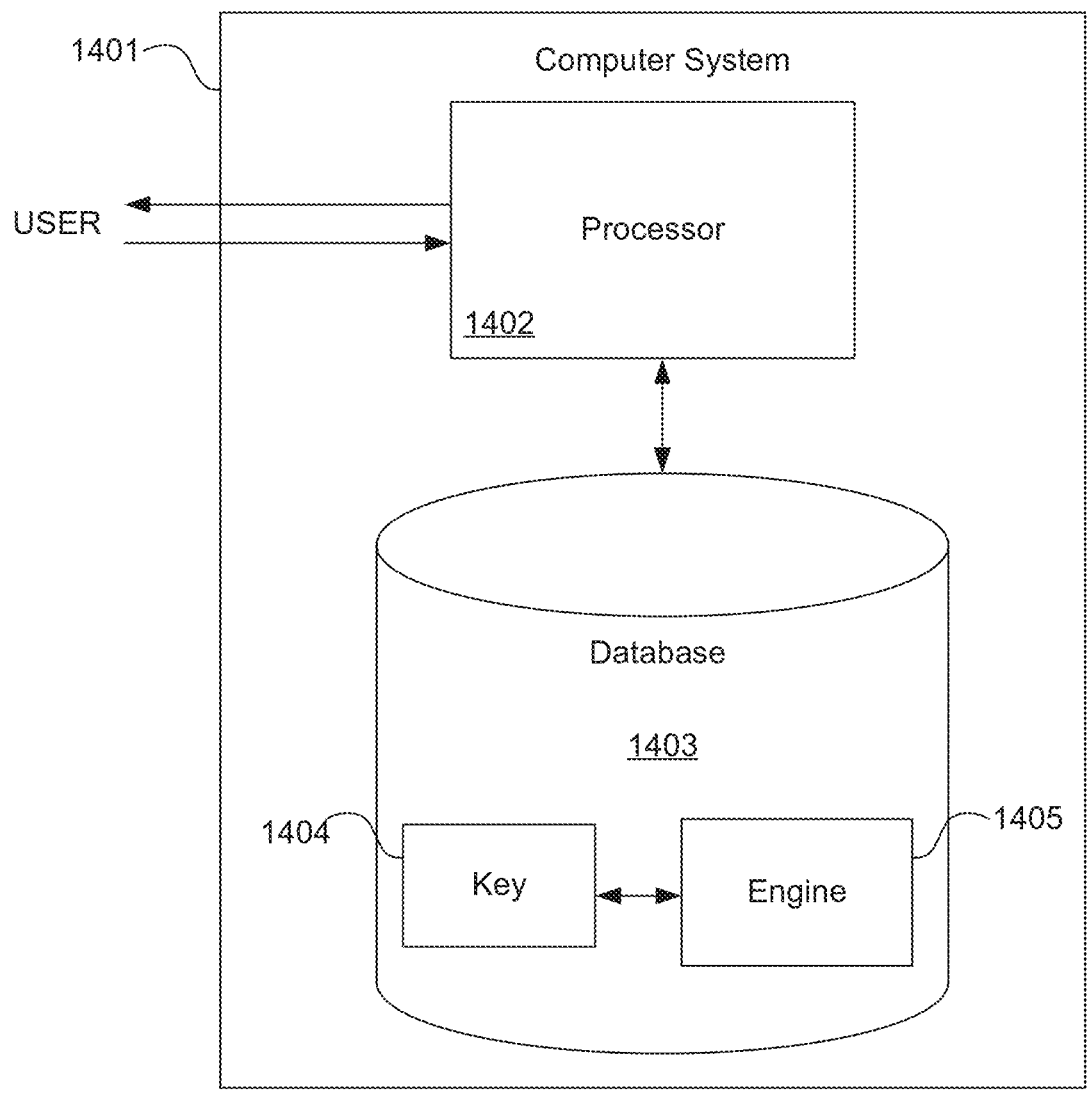
FIG. 14 illustrates hardware of a special purpose computing machine according to an embodiment that is configured to remove access to blockchain data.

Thus FIG. 14 illustrates hardware of a special purpose computing machine configured to implement content sharing according to an embodiment. In particular, computer system 1401 comprises a processor 1402 that is in electronic communication with a non-transitory computer-readable storage medium comprising a database 1403. This computer-readable storage medium has stored thereon code 1405 corresponding to an engine. Code 1404 corresponds to a key. Code may be configured to reference data stored in a database of a non-transitory computer-readable storage medium, for example as may be present locally or in a remote database server. Software servers together may form a cluster or logical network of computer systems programmed with software programs that communicate with each other and work together in order to process requests.

It is noted that rather than destroying the data in the blockchain, embodiments retain the data in a data block, but that data is thereafter inaccessible. This is inherent to the nature of a blockchain—which grows but does not shrink. Where such retention by the blockchain of the data in inaccessible form poses possible issues, the use of a storage structure other than a blockchain may be advisable.

An example computer system 1500 is illustrated in FIG. 15. Computer system 1510 includes a bus 1505 or other communication mechanism for communicating information, and a processor 1501 coupled with bus 1505 for processing information. Computer system 1510 also includes a memory 1502 coupled to bus 1505 for storing information and instructions to be executed by processor 1501, including information and instructions for performing the techniques described above, for example. This memory may also be used for storing variables or other intermediate information during execution of instructions to be executed by processor 1501. Possible implementations of this memory may be, but are not limited to, random access memory (RAM), read only memory (ROM), or both. A storage device 1503 is also provided for storing information and instructions. Common forms of storage devices include, for example, a hard drive, a magnetic disk, an optical disk, a CD-ROM, a DVD, a flash memory, a USB memory card, or any other medium from which a computer can read. Storage device 1503 may include source code, binary code, or software files for performing the techniques above, for example. Storage device and memory are both examples of computer readable mediums.

Computer system 1510 may be coupled via bus 1505 to a display 1512, such as a cathode ray tube (CRT) or liquid crystal display (LCD), for displaying information to a computer user. An input device 1511 such as a keyboard and/or mouse is coupled to bus 1505 for communicating information and command selections from the user to processor 1501. The combination of these components allows the user to communicate with the system. In some systems, bus 1505 may be divided into multiple specialized buses.

Computer system 1510 also includes a network interface 1504 coupled with bus 1505. Network interface 1504 may provide two-way data communication between computer system 1510 and the local network 1520. The network interface 1504 may be a digital subscriber line (DSL) or a modem to provide data communication connection over a telephone line, for example. Another example of the network interface is a local area network (LAN) card to provide a data communication connection to a compatible LAN. Wireless links are another example. In any such implementation, network interface 1504 sends and receives electrical, electromagnetic, or optical signals that carry digital data streams representing various types of information.

Computer system 1510 can send and receive information, including messages or other interface actions, through the network interface 1504 across a local network 1520, an Intranet, or the Internet 1530. For a local network, computer system 1510 may communicate with a plurality of other computer machines, such as server 1515. Accordingly, computer system 1510 and server computer systems represented by server 1515 may form a cloud computing network, which may be programmed with processes described herein. In the Internet example, software components or services may reside on multiple different computer systems 1510 or servers 1531-1535 across the network. The processes described above may be implemented on one or more servers, for example. A server 1531 may transmit actions or messages from one component, through Internet 1530, local network 1520, and network interface 1504 to a component on computer system 1510. The software components and processes described above may be implemented on any computer system and send and/or receive information across a network, for example.

The above description illustrates various embodiments of the present invention along with examples of how aspects of the present invention may be implemented. The above examples and embodiments should not be deemed to be the only embodiments, and are presented to illustrate the flexibility and advantages of the present invention as defined by the following claims. Based on the above disclosure and the following claims, other arrangements, embodiments, implementations and equivalents will be evident to those skilled in the art and may be employed without departing from the spirit and scope of the invention as defined by the claims.

What is claimed is:

1. A method comprising:
   receiving unencrypted data by a key server from a local source;
   encrypting at least a portion of the unencrypted data with at least one composite key stored in a database on the key server to create encrypted data, wherein the at least one composite key comprises a first key associated with a first subset of the encrypted data and a second key associated with a second subset of the encrypted data, wherein the first key and the second key are generated by the key server;
   storing the encrypted data in a block of a blockchain, wherein the blockchain is remote from the key server;
   receiving an input to the key server;
   processing the input to remove access to the encrypted data in the block, wherein the processing comprises:
      deleting the first key or a pointer to the first key of the at least one composite key at a first time; and
      deleting the second key or a pointer to the second key of the at least one composite key at a second time, wherein the first time and the second time are independently selected; and
   wherein prior to receiving the input, receiving the encrypted data from the blockchain, decrypting the encrypted data, and upon receiving a hold instruction, storing a copy of the decrypted data in a hold database outside of the database on the key server and the blockchain.

2. The method as in claim 1 further comprising:
   prior to receiving the input, receiving the encrypted data from the blockchain;
   decrypting the encrypted data using the at least one composite key; and
   communicating the decrypted data to a user of the blockchain.

3. The method as in claim 1 wherein the input comprises an instruction associated with a timestamp.

4. The method as in claim 1 wherein the encrypted data comprises a symmetrical cipher.

5. The method as in claim 1 wherein the encrypted data is encrypted according to Advanced Encryption Standard (AES).

6. The method as in claim 1 wherein:
   the database comprises an in-memory database; and
   the encryption is performed by an in-memory database engine of the in-memory database.

7. The method of claim 1, wherein the first key is associated with a category in the encrypted data and the second key is associated with a user identity in the encrypted data.

8. The method of claim 1, wherein the input comprises a periodic automatic input.

9. The method of claim 1, wherein the key server and the hold database are located on a restricted side of a system that limits access to particular users, and the blockchain is located on an unrestricted side of the system that allows access to all users.

10. A non-transitory computer readable storage medium embodying a computer program for performing a method, said method comprising:
    receiving unencrypted data by a key server from a local source;
    encrypting at least a portion of the unencrypted data with at least one composite key stored in a database on the key server to create encrypted data, wherein the at least one composite key comprises a first key associated with a first subset of the encrypted data and a second key associated with a second subset of the encrypted data, wherein the first key and the second key are generated by the key server;
    storing the encrypted data in a block of a blockchain, wherein the blockchain is remote from the key server;
    receiving the encrypted data from the block of the blockchain;
    decrypting the encrypted data using the at least one composite key;
    communicating the decrypted data to a user of the blockchain;
    receiving an input to the key server; and
    processing the input to remove access to the encrypted data in the block, wherein the processing comprises:
       deleting the first key or a pointer to the first key of the at least one composite key at a first time; and
       deleting the second key or a pointer to the second key of the at least one composite key at a second time, wherein the first time and the second time are independently selected;
    wherein prior to receiving the input, receiving the encrypted data from the blockchain, decrypting the encrypted data, and upon receiving a hold instruction, storing a copy of the decrypted data in a hold database outside of the database on the key server and the blockchain.

11. The non-transitory computer readable storage medium as in claim 10 wherein the input comprises an instruction associated with a timestamp.

12. The non-transitory computer readable storage medium of claim 10, wherein the first key is associated with a category in the encrypted data and the second key is associated with a user identity in the encrypted data.

13. The non-transitory computer readable storage medium of claim 10, wherein the first time and the second time are selected by the user.

14. A computer system comprising:
    one or more processors; and
    at least one non-transitory computer readable medium storing computer executable instructions that when executed by the one or more processors cause an in-memory database engine of an in-memory source database to:
    receive unencrypted data by a key server from a local source;
    encrypt at least a portion of the unencrypted data with at least one composite key stored in the in-memory source database on the key server to create encrypted data, wherein the at least one composite key comprises a first key associated with a first subset of the encrypted data and a second key associated with a second subset of the encrypted data, wherein the first key and the second key are generated by the key server;

store the encrypted data in a block of a blockchain, wherein the blockchain is remote from the key server;

receive an input to the key server; and process the input to remove access to the encrypted data in the block, wherein the processing comprises:

delete the first key or a pointer to the first key of the at least one composite key at a first time; and delete the second key or a pointer to the second key of the at least one composite key at a second time, wherein the first time and the second time are independently selected;

wherein prior to receiving the input, receive the encrypted data from the blockchain, decrypt the encrypted data using the at least one composite key, and communicate the decrypted data to a user of the blockchain.

15. The system of claim 14, further comprising:

a key server and a hold database located on a restricted side of the system limiting access to particular users, and the blockchain located on an unrestricted side of the system allowing access to all users.

16. The computer system as in claim 14 wherein the input comprises an instruction associated with a timestamp.

17. The computer system of claim 14, wherein the first key is associated with a category in the encrypted data and the second key is associated with a user identity in the encrypted data.

18. The computer system of claim 14, wherein the input comprises a periodic automatic input.

* * * * *